(12) United States Patent
Tian et al.

(10) Patent No.: US 10,225,587 B1
(45) Date of Patent: Mar. 5, 2019

(54) MOTION ESTIMATION METHOD FOR FRAME RATE CONVERTER AND VIDEO PROCESSOR USING THE SAME

(71) Applicant: NOVATEK Microelectronics Corp., Hsin-Chu (TW)

(72) Inventors: Xi Tian, Xi'an (CN); Xin Huang, Xi'an (CN); Pengyuan Hu, Xi'an (CN)

(73) Assignee: NOVATEK Microelectronics Corp., Hsin-Chu (TW)

( * ) Notice: Subject to any disclaimer, the term of this patent is extended or adjusted under 35 U.S.C. 154(b) by 0 days.

(21) Appl. No.: 15/846,220

(22) Filed: Dec. 19, 2017

(51) Int. Cl.
*H04N 7/01* (2006.01)
*H04N 21/2343* (2011.01)
*H04N 21/24* (2011.01)
*H04N 21/234* (2011.01)

(52) U.S. Cl.
CPC ............... *H04N 21/234381* (2013.01); *H04N 21/23406* (2013.01); *H04N 21/24* (2013.01)

(58) Field of Classification Search
CPC ..... H04N 21/234381; H04N 21/23406; H04N 21/24
USPC .......................................................... 348/441
See application file for complete search history.

(56) References Cited

U.S. PATENT DOCUMENTS

| 2007/0146346 | A1* | 6/2007 | Sata | G06F 3/03547 345/173 |
| 2009/0244389 | A1* | 10/2009 | Mishima | G06T 3/4007 348/699 |
| 2011/0013853 | A1* | 1/2011 | Chen | H04N 5/145 382/236 |
| 2011/0129015 | A1* | 6/2011 | Nguyen | H04N 19/51 375/240.16 |
| 2012/0099018 | A1* | 4/2012 | Kubo | H04N 7/014 348/441 |

* cited by examiner

*Primary Examiner* — Michael Lee
(74) *Attorney, Agent, or Firm* — Winston Hsu

(57) ABSTRACT

A motion estimation method for a frame rate converter includes generating a plurality of unidirectional motion vectors (MVs) based on a first original frame and a second original frame; classifying each of the plurality of unidirectional MVs as a reliable MV or a mismatch MV; mapping the reliable MV onto one of a plurality of blocks of an interpolation frame; classifying each of the plurality of blocks as a high confidence block or a low confidence block based on whether there is at least one reliable MV mapped onto the block; and determining an assigned MV for each of the high confidence block by selecting one of the at least one reliable MV mapped onto the high confidence block.

16 Claims, 9 Drawing Sheets

MOTION ESTIMATION METHOD FOR FRAME RATE CONVERTER AND VIDEO PROCESSOR USING THE SAME

BACKGROUND OF THE INVENTION

1. Field of the Invention

The present invention relates to a motion estimation method, and more particularly, to a motion estimation method applicable to a frame rate converter for video processing.

2. Description of the Prior Art

Motion estimation is a process of determining motion vectors (MVs) that describe the transformation from an image frame to another, usually between adjacent image frames in a video sequence. Conventionally, the three dimensional recursive search (3DRS) algorithm is applied as an iterative procedure to calculate MVs. A cost function is applied to calculate the difference between blocks and correspondingly select an MV from multiple candidate MVs.

However, sometimes the MV selected by the cost function may be a wrong MV, such that the interpolation frame block may be filled by wrong image data due to the wrong MV. In addition, the 3DRS algorithm calculates the MVs for each interpolation frame block in a predetermined order, such as from left to right and from top to bottom.

SUMMARY OF THE INVENTION

It is therefore an objective of the present invention to provide a motion estimation method for a frame rate converter to improve the accuracy of motion vector (MV) selections, in order to generate accurate images in the interpolation frame blocks.

An embodiment of the present invention discloses a motion estimation method for a frame rate converter. The motion estimation method comprises generating a plurality of unidirectional MVs based on a first original frame and a second original frame; classifying each of the plurality of unidirectional MVs as a reliable MV or a mismatch MV; mapping the reliable MV onto one of a plurality of blocks of an interpolation frame; classifying each of the plurality of blocks as a high confidence block or a low confidence block based on whether there is at least one reliable MV mapped onto the block; and determining an assigned MV for each of the high confidence block by selecting one of the at least one reliable MV mapped onto the high confidence block.

An embodiment of the present invention further discloses a video processor, which comprises a frame buffer and a frame rate converter. The frame buffer is configured for receiving a first original frame and a second original frame. The frame rate converter, coupled to the frame buffer, is configured for performing the following steps: generating a plurality of unidirectional MVs based on the first original frame and the second original frame received from the frame buffer; classifying each of the plurality of unidirectional MVs as a reliable MV or a mismatch MV; mapping the reliable MV onto one of a plurality of blocks of an interpolation frame; classifying each of the plurality of blocks as a high confidence block or a low confidence block based on whether there is at least one reliable MV mapped onto the block; and determining an assigned MV for each of the high confidence block by selecting one of the at least one reliable MV mapped onto the high confidence block.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
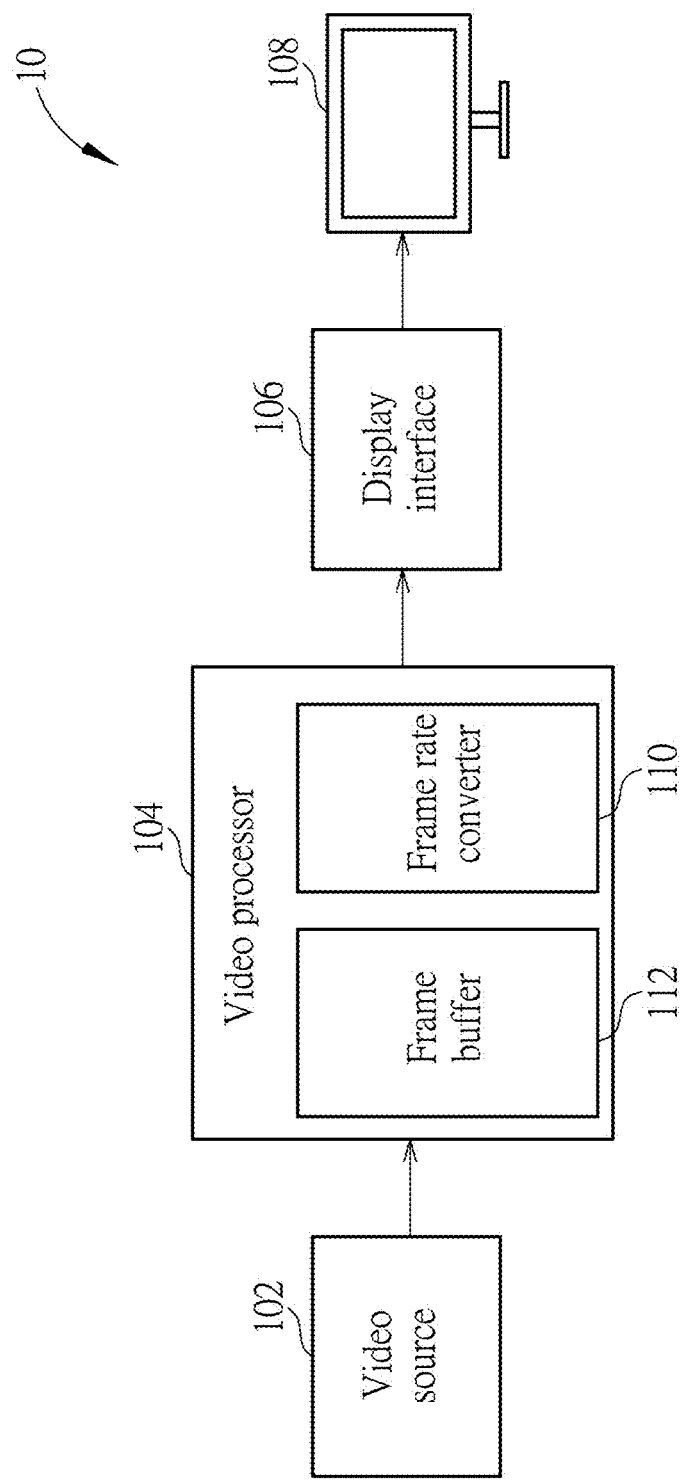
FIG. 1 is a schematic diagram of a display system according to an embodiment of the present invention.

Please refer to FIG. 1, which is a schematic diagram of a display system 10 according to an embodiment of the present invention. As shown in FIG. 1, the display system 10 includes a video source 102, a video processor 104, a display interface 106 and a screen 108. The video source 102 generates a source video to be displayed on the screen 108, where the source video may include a plurality of image frames. The display interface 106 provides necessary information for the screen 108, allowing the video to be displayed. The display interface 106 may include a source driver, a gate driver, and/or any other devices capable of driving the screen 108 to display a video.

In general, the frame rate of the source video may not be identical to the frame rate to be displayed on the screen 108. Therefore, the video processor 104 includes a frame rate converter 110 capable of converting the frame rate of the video. A frame buffer 112, which may be included in the video processor 104 (or may be a single module in the display system 10), may receive original image frames from the video source 102. The frame rate converter 110 may perform motion estimation and motion compensation, to generate interpolation frames based on the original image frames received from the frame buffer 112, so as to generate a video sequence having a frame rate conforming to the output format of the display 108. For example, if the frame rate of the video from the video source 102 is 60 Hz and the frame rate to be displayed on the screen 108 is 120 Hz, an interpolation frame is inserted between every two adjacent original frames.

In the motion estimation procedure, the frame rate converter 110 may find out the optimal motion vector (MV) for each block in the interpolation frame from a plurality of MVs mapped between the original frames. In order to improve the accuracy of motion estimation, the present invention classifies the MVs to determine whether the MVs belong to a texture area, a flat area, foreground or background, and further determines the confidence of the MVs. The motion estimation may be performed based on the classification and confidence of the MVs.

Figure 2:
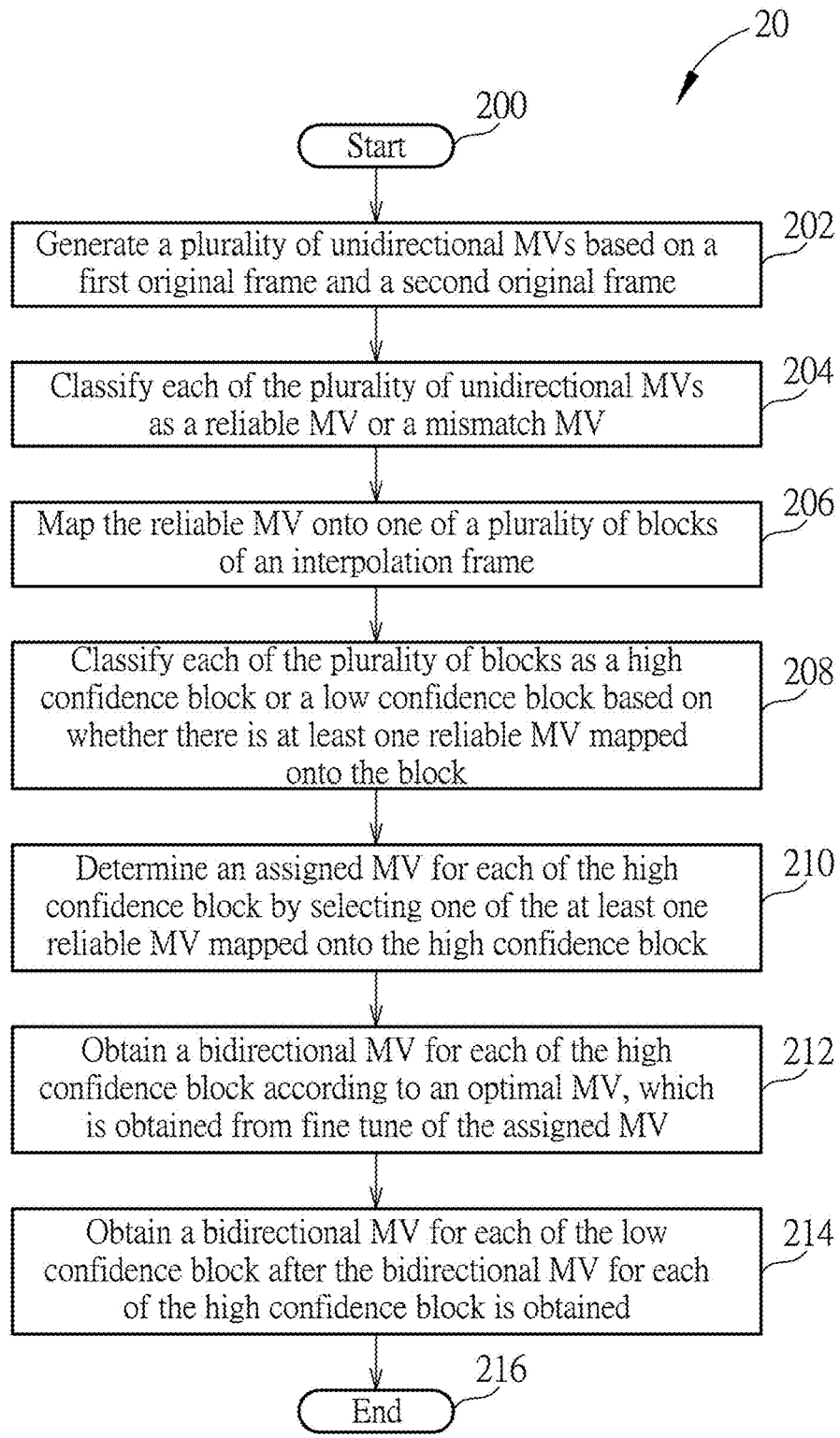
FIG. 2 is a flowchart of a motion estimation process according to an embodiment of the present invention.

Please refer to FIG. 2, which is a flowchart of a motion estimation process 20 according to an embodiment of the present invention. The motion estimation process 20, which may be utilized in the frame rate converter 110 shown in FIG. 1, may be compiled into a program code or implemented with hardware circuits and includes the following steps:

Step 200: Start.

Step 202: Generate a plurality of unidirectional MVs based on a first original frame and a second original frame.

Step 204: Classify each of the plurality of unidirectional MVs as a reliable MV or a mismatch MV.

Step 206: Map the reliable MV onto one of a plurality of blocks of an interpolation frame.

Step 208: Classify each of the plurality of blocks as a high confidence block or a low confidence block based on whether there is at least one reliable MV mapped onto the block.

Step 210: Determine an assigned MV for each of the high confidence block by selecting one of the at least one reliable MV mapped onto the high confidence block.

Step 212: Obtain a bidirectional MV for each of the high confidence block according to an optimal MV, which is obtained from fine tune of the assigned MV.

Step 214: Obtain a bidirectional MV for each of the low confidence block after the bidirectional MV for each of the high confidence block is obtained.

Step 216: End.

According to the motion estimation process 20, the frame rate converter 110 generates the unidirectional MVs based on the first original frame and the second original frame received from the frame buffer 112 (Step 202). A unidirectional MV refers to an MV directed from an original image frame to another original image frame. For example, if the first original frame and the second original frame are a previous frame and a current frame, respectively, a unidirectional MV may be directed from a block of the previous frame to a block of the current frame (as a forward MV) or from a block of the current frame to a block of the previous frame (as a backward MV). Therefore, there may be multiple unidirectional MVs between the previous frame and the current frame. When an interpolation frame is inserted between the previous frame and the current frame, the images in each block of the interpolation frame may be determined according to the above unidirectional MVs.

More specifically, each unidirectional MV directed from the previous frame to the current frame (or directed from the current frame to the previous frame) may pass through the interpolation frame inserted between these two frames, and may be mapped onto a block of the interpolation frame where the unidirectional MV passes through. For each block of the interpolation frame, there may be any number of MV(s) mapped onto the block. If a block is mapped by only one MV, the MV is selected as the assigned MV for determining the image to be filled in the block. If a block is mapped by multiple MVs, a most confidential MV among these MVs may be selected as the assigned MV for determining the image to be filled in the block. If a block has no mapping MV, the image of the block may be determined according to the MV(s) mapped onto its neighboring block(s).

Subsequently, each of the unidirectional MVs may be classified as a reliable MV or a mismatch MV according to the reliability of the MV (Step 204). In an embodiment, the reliability of the MV may be determined according to the sum of absolute difference (SAD) of the MV. In detail, the MV may be directed from a first block in the first original frame to a second block in the second original frame, and the SAD of the MV indicates the difference between the first block and the second block. Note that when the SAD is smaller, the MV may be more reliable. This is because the difference between the two blocks that determine the MV is smaller.

In an embodiment, the frame rate converter 110 may calculate the SAD of a unidirectional MV, and then compare the SAD with a first threshold TH1. When the SAD is smaller than the first threshold TH1, the unidirectional MV may be classified as a reliable MV. When the SAD is greater than the first threshold TH1, the unidirectional MV may be classified as a mismatch MV. By this method, the reliability of each of the unidirectional MVs mapped between the first original frame and the second original frame may be determined, and each of the unidirectional MVs is classified as a reliable MV or a mismatch MV. The mismatch MV seems to be a wrong MV and may be omitted in the follow-up operations and calculations of the motion estimation. In other words, the mismatch MV may not be mapped onto the interpolation frame as a candidate of the assigned MV.

The unidirectional MV classified as the reliable MV may further be determined to be in a texture area or a flat area. In the texture area, the SAD of an MV may be somewhat different from the SAD of the MVs mapped to neighboring blocks, since the neighboring blocks may carry different image information. For example, the boundary of an object or the object in the foreground may be the texture area. On the other hand, in the flat area, the SAD of an MV may be much similar to the SAD of the MVs mapped to neighboring blocks, since the image information in the neighboring blocks are identical.

In an embodiment, in addition to the SAD of the unidirectional MV, the frame rate converter 110 may further calculate an average of neighboring SAD of the unidirectional MV, in order to determine whether the unidirectional MV is in the texture area or the flat area. The difference between the SAD and the average of neighboring SAD is obtained and compared with a second threshold TH2. When the difference between the SAD and the average of neighboring SAD is greater than the second threshold TH2, the MV may be determined to be in the texture area. When the difference between the SAD and the average of neighboring SAD is smaller than the second threshold TH2, the MV may be determined to be in the flat area. The difference between the SAD and the average of neighboring SAD indicates whether there is a texture or boundary near the block corresponding to the MV. By this method, each of the reliable MV may be determined to be in the texture area (such as in the foreground) or in the flat area (such as in the background).

For example, the average of neighboring SAD of the unidirectional MV directed from a block Y in a current frame may be calculated, in order to determine whether the block Y is in the flat area or the texture area. There may be multiple backward MVs directed to various blocks in a previous frame from the block Y in the current frame. Suppose that a block X in the previous frame is determined to be matched with the block Y in the current frame since a backward MV directed from the block Y to the block X has a minimum SAD among the backward MVs directed from the block Y to the previous frame, such that this backward MV directed to the block X is selected as the unidirectional MV directed from the block Y.

Figure 3:
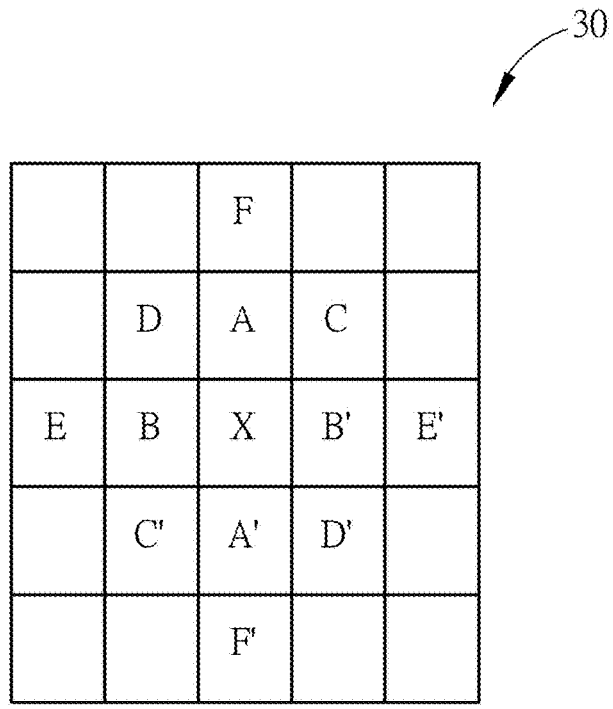
FIG. 3 is a schematic diagram of calculating the average of neighboring SAD according to an embodiment of the present invention.

Please refer to FIG. 3, which is a schematic diagram of calculating the average of neighboring SAD according to an embodiment of the present invention. FIG. 3 illustrates a previous frame 30, which has the block X to which the unidirectional MV from the block Y is directed and its neighboring blocks A, A', B, B', C, C', D, D', E, E', F and F'. Those skilled in the art should know that there may be hundreds or thousands of blocks in the previous frame 30, and FIG. 3 may only include a part of the previous frame 30.

When the unidirectional MV directed from the block Y is determined to be reliable, the average of neighboring SAD of the reliable MV may be obtained. In order to calculate the average of neighboring SAD of the unidirectional MV, the SADs between the block Y with these blocks A, A', B, B', C, C', D, D', E, E', F and F' neighbor to the block X may be determined. In this embodiment, the SAD between the block A and the block Y and the SAD between the block A' and the block Y are calculated, among which the smaller one is obtained. The SAD between the block B and the block Y and the SAD between the block B' and the block Y are calculated, among which the smaller one is obtained. By the same token, totally six SAD values are obtained based on the SAD between the block Y in the current frame and the blocks A, A', B, B', C, C', D, D', E, E', F and F' in the previous frame 30. These six SAD values are averaged to obtain the average of neighboring SAD. If the block Y is in the flat area, the SAD of the MV may be similar to the average of neighboring SAD obtained by the above method. Otherwise, if the block Y is in the texture area, the texture may cause the average of neighboring SAD to be greater than the SAD of the MV. Note that the above method of obtaining the average of neighboring SAD is one of various examples of the present invention, and the average of neighboring SAD may be obtained by another method such as using different numbers of neighboring blocks to perform averaging.

Figure 4:
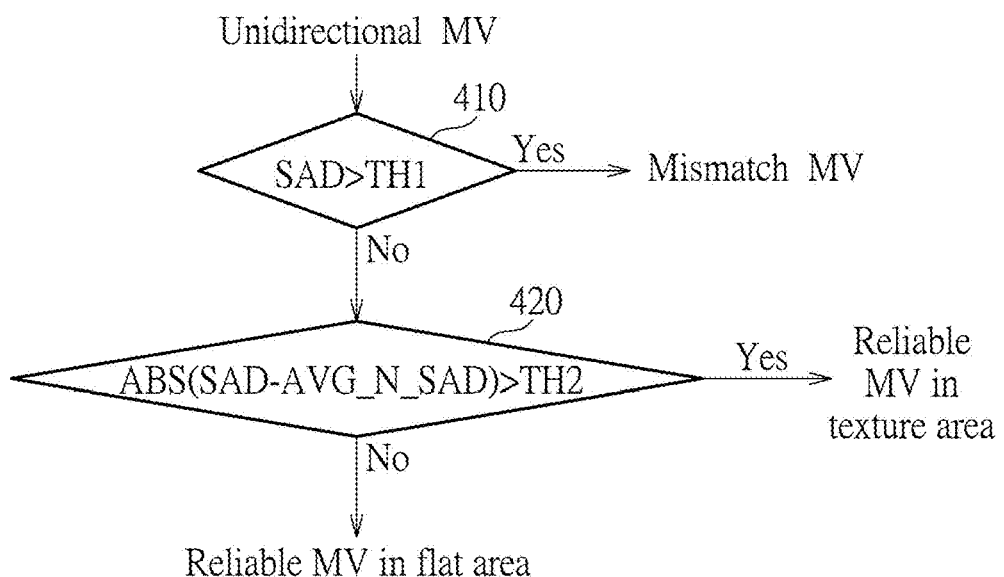
FIG. 4 is a flowchart of a process according to an embodiment of the present invention.

Therefore, each of the unidirectional MV may be classified as a mismatch MV, a reliable MV in the texture area, or a reliable MV in the flat area. The classification method may be summarized into a process 40, as shown in FIG. 4. The process 40 may be realized in the frame rate converter 110 and includes the following steps:

Step 410: Determine whether the SAD of the unidirectional MV is greater than the first threshold TH1. If yes, the unidirectional MV is classified as a mismatch MV; otherwise, the unidirectional MV is classified as a reliable MV, and go to Step 420.

Step 420: Determine whether the absolute value (ABS) of the SAD minus the average of neighboring SAD (AVG_N_SAD) (which indicates the difference between the SAD and the average of neighboring SAD) is greater than the second threshold TH2. If yes, the reliable MV is in the texture area; otherwise, the reliable MV is in the flat area.

After the unidirectional MVs are classified, each of the reliable MVs is mapped onto one of the blocks of an interpolation frame which is inserted between the first original frame and the second original frame (Step 206). As mentioned above, a block of the interpolation frame may be mapped by multiple reliable MVs, only one reliable MV, or no reliable MV; hence, the blocks of the interpolation frame may be classified accordingly. More specifically, each block of the interpolation frame may be classified as a high confidence block or a low confidence block based on whether there is at least one reliable MV mapped onto the block (Step 208). In detail, when there is at least one reliable MV mapped onto a first block, the first block is classified as the high confidence block; when there is no reliable MV mapped onto a second block, the second block is classified as the low confidence block. Note that the mismatch MV(s) may not be considered and mapped onto any block since the mismatch MV(s) may not be accurate MV(s).

Subsequently, an assigned MV is determined for each high confidence block by selecting one of the at least one reliable MV mapped onto the high confidence block (Step 210). If there is only one reliable MV mapped onto a high confidence block, this only one reliable MV is selected as the assigned MV. If there are multiple reliable MVs mapped onto a high confidence block, a selection criterion is applied to select one of the multiple reliable MVs as the assigned MV.

Figure 5:
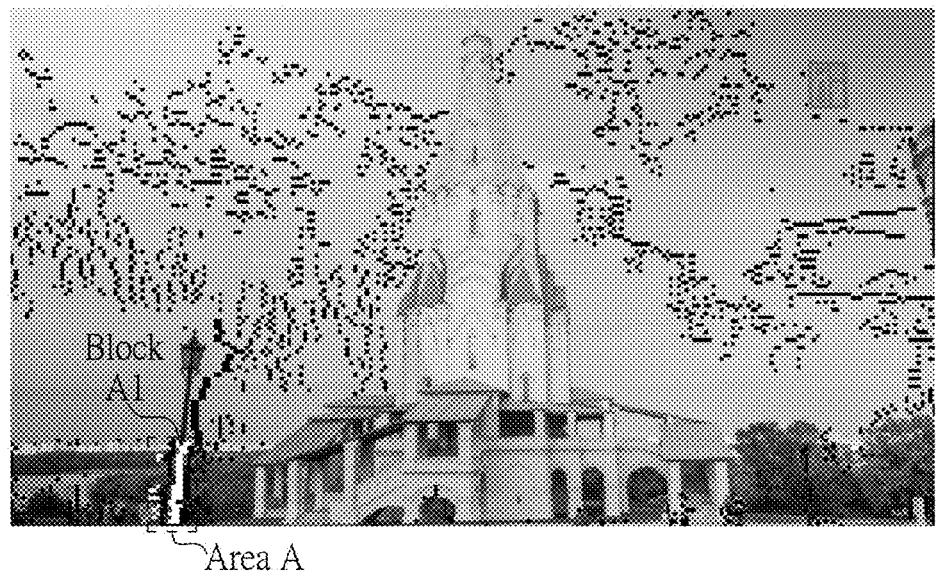
FIG. 5 illustrates an exemplary image on an interpolation frame for describing the motion estimation operations of the present invention.

FIG. 5 illustrates an exemplary image on an interpolation frame for describing the motion estimation operations of the present invention. The interpolation frame may be filled with an image including a house with trees, grasses and a lamppost. The interpolation frame includes a plurality of blocks. As shown in FIG. 5, the high confidence blocks show the interpolated image data obtained according to one of the reliable MVs mapped onto the block, and the low confidence blocks are denoted by black dots. In this embodiment, a video is recorded on a moving object such as a vehicle, and the recorded target is the house. The sky may be considered as the background. Since the house is the video target, the movement of the house is quite small and the house may also be considered as the background. The lamppost is closer to the video maker, and has a movement in the video when the vehicle moves; hence, the lamppost may be considered as the foreground. Since the video is recorded on a vehicle, several objects change their positions between the first original frame and the second original frame. More specifically, the video recorder is moving while the scenery is static, such that the position of the lamppost relative to the house changes. It looks like the lamppost moves rightward while the house and sky stay still with only a slight change of visual angle, if the vehicle moves leftward.

In FIG. 5, the texture areas may appear in the borders and corners of the house, the trees, grasses, and the lamppost areas, while the flat area may include the sky or the areas inside the house.

As mentioned above, each reliable MV is determined to be in the texture area or the flat area after calculations of the SAD and the average of neighboring SAD. If there are more than two reliable MVs mapped onto a high confidence block and all of the reliable MVs mapped onto the high confidence block are in the flat area, any one of these reliable MVs may be selected as the assigned MV. Note that the flat area is an area where the image information in neighboring blocks is identical, such as the background area; hence, the reliable MVs in the flat area may include identical image information. No matter which one reliable MV is determined to be the assigned MV for the block, the interpolated image in the block may be identical and their difference may not be distinguishable. In such a situation, any one of the reliable MVs in the flat area may be selected as the assigned MV.

Please note that the house and sky areas shown in FIG. 5 may also include several blocks mapped by multiple reliable MVs. The assigned MV for each of these blocks may be selected from any one of the reliable MVs mapped onto the block. Since these MVs are in the flat area, the block may be filled with similar image no matter which MV is selected as the assigned MV.

For another high confidence block, there may be more than two reliable MVs mapped onto the high confidence block and these reliable MVs include at least one first reliable MV in the texture area. In such a situation, one of the first reliable MV may be selected as the assigned MV for the high confidence block. The selection criterion is that the reliable MV(s) in the texture area may have higher confidence than the reliable MV(s) in the flat area. Note that the MVs are determined to be in the flat area or the texture area according to a cost function such as the SAD. In general, a unidirectional MV directed from a specific block may be determined by selecting one of the MVs directed from the specific block that has a minimum SAD. If the selected MV is in the flat area, the SAD of this MV may be similar to the SADs of other MVs directed to neighboring blocks. In such a situation, the selected MV may have a lower confidence since the accurate MV and several wrong MVs may not be easily differentiated; i.e., the selected MV may not be the accurate MV. In comparison, if the selected MV is in the texture area, the SAD of this MV may be much smaller than the SAD of other MVs directed to neighboring blocks. In such a situation, the selected MV may have a higher confidence since the selected MV is the accurate MV more probably.

As a result, if both of the reliable MV(s) in the texture area and the reliable MV(s) in the flat area are mapped onto a block, the assigned MV for the block is selected from the reliable MV(s) in the texture area since the reliable MV(s) in the texture area has a higher confidence. Taking FIG. 5 as an example, the blocks mapped by both of the reliable MV(s) in the texture area and the reliable MV(s) in the flat area substantially appear in the upper half part of the lamppost on the sky background. Namely, several blocks in this lamppost area may be mapped by the MV(s) directed to/from the lamppost area and also mapped by the MV(s) directed to/from the sky area. According to the above selection criterion, the reliable MV(s) in the texture area (i.e., the MV(s) directed to/from the lamppost area or the foreground) may have higher confidence than the reliable MV(s) in the flat area (i.e., the MV(s) directed to/from the sky area or the background). Therefore, the MVs directed to/from the lamppost area may be selected as the assigned MVs for these blocks.

In detail, if there is only one reliable MV in the texture area among the reliable MVs mapped onto the block, this reliable MV in the texture area is selected as the assigned MV for the block. Alternatively, if there are more than two reliable MVs in the texture area among the reliable MVs mapped onto the block, another criterion is applied to determine the confidence of each of the reliable MVs in the texture area, in order to obtain the assigned MV.

In an embodiment, if there are multiple reliable MVs in the texture area mapped onto the block, the block may further be classified based on the similarity between these reliable MVs. More specifically, the frame rate converter 110 may determine the similarity between the reliable MVs mapped onto the block and then perform the classification. If the similarity between the reliable MVs mapped onto the block is higher than a threshold (or the difference between the reliable MVs is lower than a threshold), the block may be classified as a small-MV-diff block. If the similarity between the reliable MVs mapped onto the block is lower than the threshold (or the difference between the reliable MVs is higher than the threshold), the block may be classified as a big-MV-diff block. The similarity between the reliable MVs may be obtained by, for example, using a clustering algorithm.

For a block classified as a small-MV-diff block, the reliable MVs mapped onto the block are similar. No matter which one reliable MV is determined as the assigned MV for the block, the interpolated image in the block may be similar and their difference may not be distinguishable. In such a situation, any one of the reliable MVs in the small-MV-diff block may be selected as the assigned MV for the small-MV-diff block. The small-MV-diff blocks may appear in the grass or tree areas as shown in FIG. 5. These areas are texture areas, but the difference between the MVs mapped onto these areas may be small.

For a block classified as a big-MV-diff block, the reliable MVs mapped onto the block are different; hence, a selection criterion should be applied to select the most appropriate reliable MV as the assigned MV. The confidence of these reliable MVs should be determined, and the reliable MV having the highest confidence may be selected as the assigned MV. The big-MV-diff blocks may appear in the lower half part of the lamppost, as the white blocks in the area A shown in FIG. 5. Among these big-MV-diff blocks, an MV directed to/from the lamppost area and an MV directed to/from the grass area may intersect on a block. The MV of the lamppost area and the MV of the grass area have a larger difference and carry different image information. Therefore, the assigned MV for the block should be determined accurately, in order to fill with correct image in the block.

In an embodiment, a statistic method is applied to determine the confidence of the reliable MVs. In detail, the frame rate converter 110 may collect the reliable MVs mapped onto other small-MV-diff blocks to generate a statistic result of values of the reliable MVs. The assigned MV may be selected from the reliable MVs mapped onto the big-MV-diff block according to the statistic result.

Figure 6:
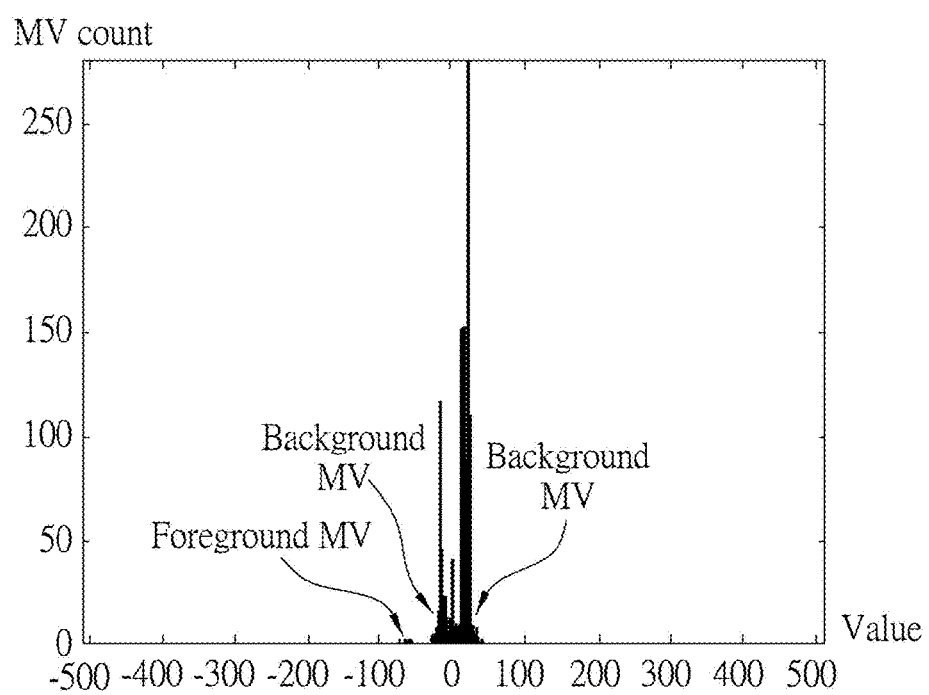
FIG. 6 is a histogram illustrating the count of collected reliable MVs mapped onto the other small-MV-diff blocks with the values of the collected reliable MVs.

A detailed implementation of generating the statistic result is shown in FIG. 6, which is a histogram illustrating the count of collected reliable MVs mapped onto the other small-MV-diff blocks with the values of the collected reliable MVs. In the histogram, the horizontal axis refers to values of the collected MVs, where the values may indicate the movement of image of an object along a specific direction; and the vertical axis refers to the count of collected MVs.

As shown in FIG. 6, the values of the MVs are concentrated on several points near zero. More specifically, the highest peak appears on a value near 20 and the second highest peak appears on a value near −20. The MVs having these values may be considered as the background MVs. This is because the background occupies most areas in an image frame, such that there are much more background MVs in the image frame. In this embodiment, the histogram illustrates the count of unidirectional MVs with their values, and these unidirectional MVs are obtained from the original image frames for generating the interpolated frame shown in FIG. 5. The highest peak near 20 may be composed of the MVs directed to/from the sky area, and the second highest peak near −20 may be composed of the MVs directed to/from the house area, which are the background of the image frame.

In addition, there are only few MVs appearing on the values near −70. These values are distinct from the values of the background MVs, and these MVs may be considered as the foreground MVs. In this embodiment, the foreground MVs may be the MVs directed to/from the lamppost area.

In such a situation, an MV may be determined to be a foreground MV or a background MV according to a value of the MV. The statistic result of values of the MVs shows that the count of background MVs is greater than the count of foreground MVs. As mentioned above, there are multiple reliable MVs mapped onto a big-MV-diff block. Several of the reliable MVs may be directed to/from the foreground area, and others may be directed to/from the background area. An MV directed to/from the foreground area may have a higher confidence; hence, it is preferable to select the MV having the highest confidence as the assigned MV, and the selected MV may be a foreground MV more probably.

In an embodiment, the confidence of the reliable MVs mapped onto a big-MV-diff block may be determined by the following method. For each of the reliable MVs mapped onto the big-MV-diff block, a range of values may be configured based on the value of the reliable MV, and then the count of MVs having values within the range is obtained according to the statistic result of the values of MVs such as the histogram shown in FIG. 6. For example, if the value of an MV is 50, a range between 40 and 60 may be configured (where the value of the MV, 50, is the center of the range), and the count of MVs having values within the configured range, e.g., between 40 and 60, may be obtained. Subsequently, the confidence of each reliable MV mapped onto the big-MV-diff block is obtained. The most confidential MV among these reliable MVs has a highest confidence if the count of MVs corresponding to the most confidential MV is less than the count of MVs corresponding to any other reliable MVs mapped onto the big-MV-diff block. In other words, a specific MV may be considered most confidential and determined to be the assigned MV for the big-MV-diff block when the collected MVs obtained within a range corresponding to the specific MV has the least count.

If an MV mapped onto the big-MV-diff block is directed to/from the background area, the count of MVs obtained by the above method may be large. This is because the background occupies most areas in the image frames and the accumulated MV count with values close to background MVs may be large. If an MV mapped onto the big-MV-diff block is directed to/from the foreground area, the count of MVs obtained by the above method may be small. This is because the foreground area is small in the image frames and the accumulated MV count with values close to foreground MVs may be small. FIG. 6 shows an example where the background MVs construct a higher peak since the count of background MVs is much more than the foreground MVs. Therefore, the MV count corresponding to each reliable MV mapped onto the big-MV-diff block may be obtained, and the MV count indicates that the corresponding reliable MV is a foreground MV or a background MV. A reliable MV that corresponds to the least MV count may be selected to be the assigned MV. Note that the selected MV may be a foreground MV more probably. In an embodiment, if there is no foreground MV mapped onto the big-MV-diff block, a background MV corresponding to the least MV count may be considered as most confidential and selected as the assigned MV.

Please note that the big-MV-diff blocks are substantially located in the lower half part of the lamppost (i.e., in the area A) as shown in FIG. 5. For any of these big-MV-diff blocks, an MV directed to/from the lamppost may be mapped onto the block while an MV directed to/from the grass area may be mapped onto the block. If a wrong selection is made for these big-MV-diff blocks, the interpolated image may show a broken lamppost or the lamppost may be cut into multiple parts. Therefore, in this embodiment, frame interpolation for the big-MV-diff blocks is one of the most important issues to be dealt with. On the other hand, for other small-MV-diff blocks or the blocks mapped by the MV(s) in the flat area only, the influence of the selection result on the interpolated image may be quite small.

Figure 7:
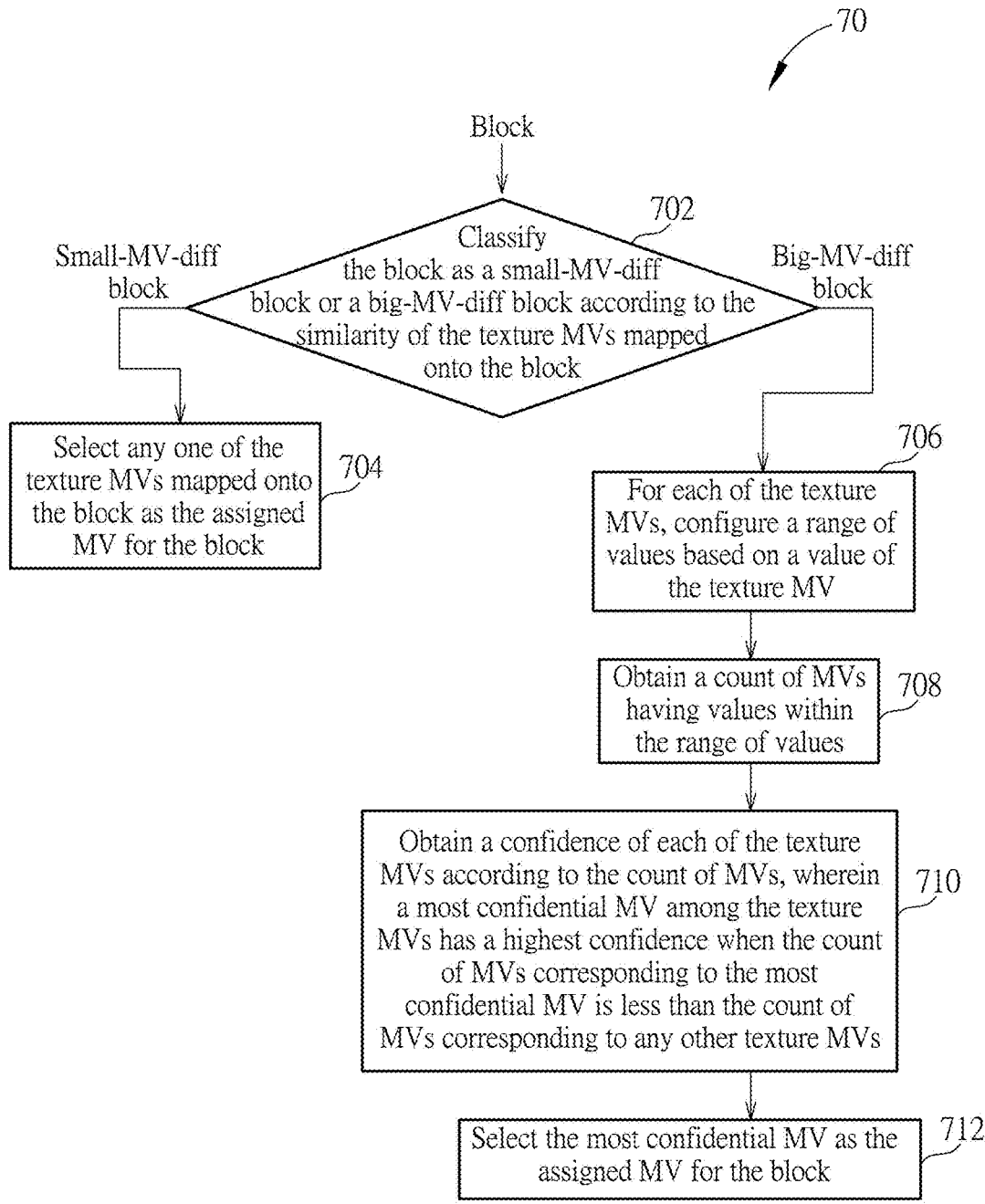
FIG. 7 is a flowchart of a process according to an embodiment of the present invention.

The abovementioned methods of determining the confidence of multiple MVs in the texture area (herein texture MVs) mapped onto the same block and then determining the assigned MV for the block may be summarized into a process 70, as shown in FIG. 7. The process 70 may be realized in the frame rate converter 110 and includes the following steps:

Step 702: Classify the block as a small-MV-diff block or a big-MV-diff block according to the similarity of the texture MVs mapped onto the block. If the similarity is higher than a threshold, classify the block as a small-MV-diff block, and go to Step 704; if the similarity is lower than the threshold, classify the block as a big-MV-diff block, and go to Step 706.

Step 704: Select any one of the texture MVs mapped onto the block as the assigned MV for the block.

Step 706: For each of the texture MVs, configure a range of values based on a value of the texture MV.

Step 708: Obtain a count of MVs having values within the range of values.

Step 710: Obtain a confidence of each of the texture MVs according to the count of MVs, wherein a most confidential MV among the texture MVs has a highest confidence when the count of MVs corresponding to the most confidential MV is less than the count of MVs corresponding to any other texture MVs.

Step 712: Select the most confidential MV as the assigned MV for the block.

Please keep referring to FIG. 5. As mentioned above, the big-MV-diff blocks are substantially located in the area A. Taking a specific block A1 in the area A as an example, the block A1 may be mapped by two reliable MVs MV1 and MV2, where MV1=(25,0) and MV2=(−68,8). Note that an MV with values (x,y) refers to the motions in x-direction (horizontal direction) and y-direction (vertical direction), respectively. In this embodiment, the unit of MV values is ¼ pixel size. For example, the value x=−68 refers to a motion of −17 pixels in the horizontal direction, e.g., moving leftward with a negative value. A block size may include any number of pixels, such as 4 pixels (arranged as 2×2) or 16 pixels (arranged as 4×4).

Figure 8A:
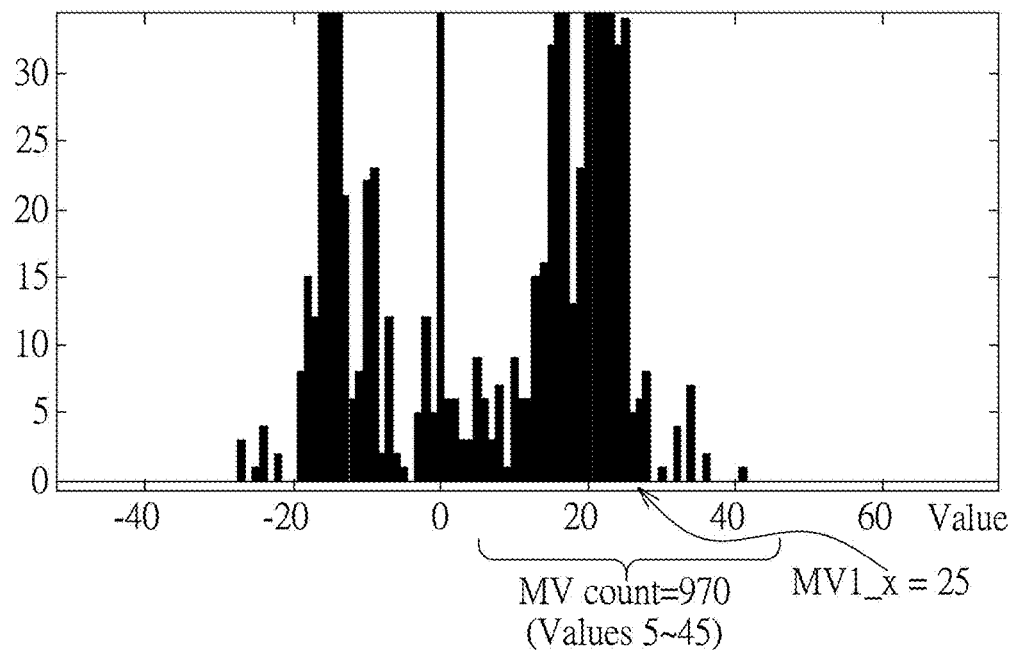
FIGS. 8A and 8B respectively illustrate a portion of the histogram shown in FIG. 6.
Figure 8B:
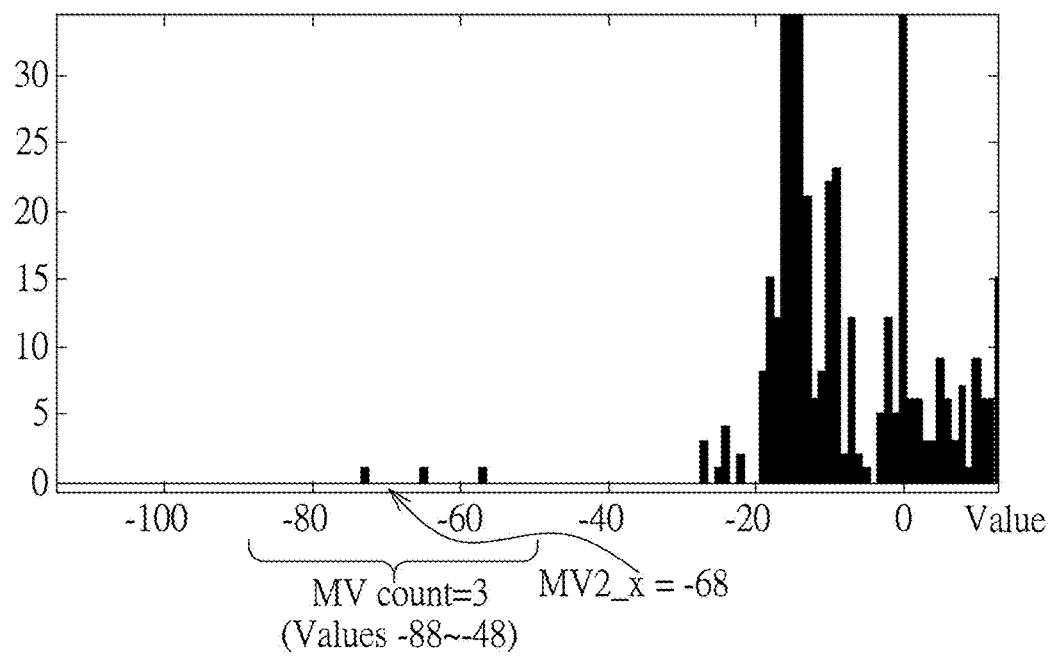

Since the difference between the reliable MVs MV1 and MV2 are large, the block A1 may be classified as the big-MV-diff block. As mentioned above, the video sequence is recorded on a moving vehicle, and thus the horizontal movement is the main factor to be considered; hence, the x component of the reliable MVs MV1 and MV2 is applied to determine the confidence. FIGS. 8A and 8B respectively illustrate a portion of the histogram shown in FIG. 6. As shown in FIG. 8A, the x component of the reliable MV MV1 is 25, and thus a range of values between 5 and 45 (i.e., 25±20) is considered. In this range, the accumulated MV count equals 970. As shown in FIG. 8B, the x component of the reliable MV MV2 is −68, and thus a range of values between −88 and −48 (i.e., −68±20) is considered. In this range, the accumulated MV count equals 3. Since the accumulated MV count corresponding to the reliable MV MV2 is less than the accumulated MV count corresponding to the reliable MV MV1, the reliable MV MV2, (−68,8), has a higher confidence and is selected as the assigned MV for the block A1. Note that the reliable MV MV1 may be a background MV and the reliable MV MV2 may be a foreground MV according to their values in consideration of the histogram shown in FIG. 6.

According to the above classification and selection methods, the assigned MV for each high confidence block is obtained. The assigned MV is selected from unidirectional MVs and may have enough accuracy according to the selection criterions mentioned above. In order to further enhance the visual effects of the interpolation frame image, the assigned MV may be finely tuned to achieve higher accuracy. In an embodiment, for each high confidence block with the assigned MV, a candidate MV set is generated which includes the assigned MV and at least one candidate MV each obtained by adding a random value to the assigned MV. Subsequently, an optimal MV for the high confidence block is selected from the candidate MV set, i.e., the optimal MV may be the assigned MV or may be slightly modified from the assigned MV. The optimal MV may be selected according to an appropriate cost function such as the SAD. For example, the SAD of each of the MVs in the candidate MV set is calculated, and the MV with a minimum SAD value is selected as the optimal MV.

Please note that the candidate set allows a fine tune of the assigned MV to reach the optimal MV. The random value added to the assigned MV may be a value smaller than one block size. The random value may be configured arbitrarily, and may be a positive value or negative value that tunes the MV in any direction. The operations of randomly tuning the assigned MV and selecting the optimal MV achieve higher performance of motion estimation and thereby achieve better visual effects on the interpolation frame image.

In the above example, after the reliable MV MV2, (−68,8), is selected as the assigned MV for the block A1, a candidate MV set is generated which may include MVs {(−68,8), (−69,8), (−68,12)}. After the cost function such as the SAD of these MVs is calculated, the MV (−68,8) may be selected as the optimal MV for the block A1 according to the cost function.

In this manner, for each of the high confidence block, an optimal MV is obtained according to the assigned MV. Subsequently, a bidirectional MV may be obtained according to the optimal MV for each of the high confidence block (Step 212). The bidirectional MV is an MV directed from an interpolation frame block to a block in a previous original frame and also to a block in a next original frame. The image on this interpolation frame block may be obtained from the previous original frame and the next original frame according to the bidirectional MV. The operation of obtaining the bidirectional MV according to the optimal MV (which is selected from the unidirectional MV as mentioned above) may follow a conventional method such as the three dimensional recursive search (3DRS) algorithm. The details of the 3DRS algorithm, which should be well known by those skilled in the art, will not be narrated herein.

After the bidirectional MV for each of the high confidence block is obtained completely, the motion estimation method of the present invention starts to deal with the low confidence blocks; that is, the bidirectional MVs for the low confidence blocks start to be calculated (Step 214). In this way, the present invention provides a non-sequential 3DRS method different from the conventional 3DRS method.

Figure 9:
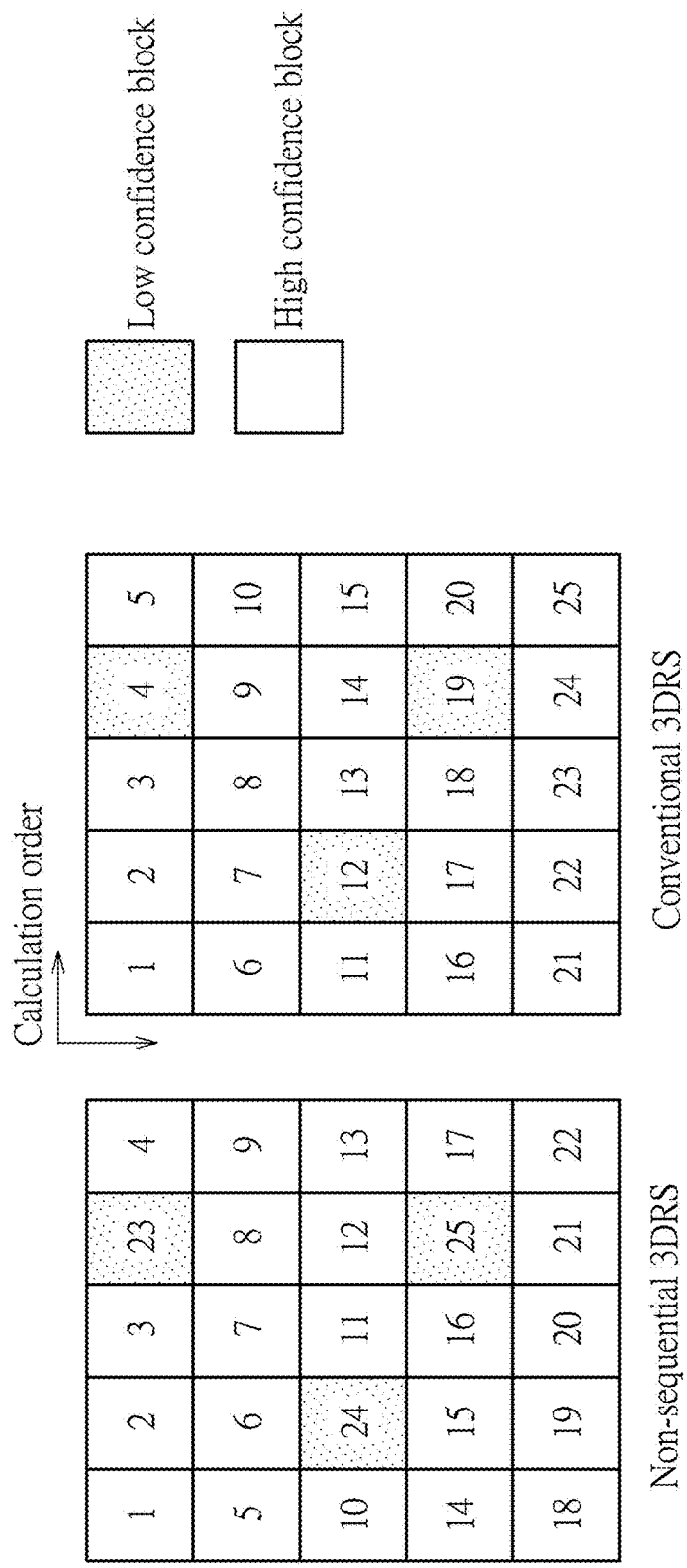
FIG. 9 is a schematic diagram of comparison between the conventional 3DRS method and the non-sequential 3DRS method according to an embodiment of the present invention.

Please refer to FIG. 9, which is a schematic diagram of comparison between the conventional 3DRS method and the non-sequential 3DRS method according to an embodiment of the present invention. As shown in FIG. 9, the 3DRS algorithm calculates the bidirectional MVs for the blocks in an order from No. 1, No. 2 . . . , to No. 25. According to the conventional method, the 3DRS is performed sequentially, i.e., from left to right and from top to bottom, no matter whether there is any unidirectional MV mapped onto the blocks. In comparison, according to an embodiment of the present invention, the non-sequential 3DRS calculates the bidirectional MVs for the high confidence blocks (No. 1 to 22), and calculates the bidirectional MVs for the low confidence blocks (No. 23 to 25) after the bidirectional MVs for all high confidence blocks are completely obtained. Note that there is no reliable MV or unidirectional MV mapped onto the low confidence blocks, and thus the low confidence blocks have no assigned MV. Therefore, the bidirectional MVs of the low confidence blocks may be obtained by other method.

In an embodiment, the bidirectional MV for a low confidence block may be calculated based on the bidirectional MV(s) obtained in its neighboring block(s). For example, as shown in the left half part of FIG. 9, the bidirectional MV for the block No. 24 may be calculated based on the bidirectional MVs for the blocks No. 6, 10, 11 and/or 15. More specifically, the bidirectional MVs for the blocks No. 6, 10, 11 and/or 15 may be selected to generate a candidate MV set, and an optimal MV for the block No. 24 may be selected from the candidate MV set according to a cost function such as the SAD. Since the optimal MVs and bidirectional MVs obtained for the high confidence blocks have high confidence according to the motion estimation method mentioned above, the bidirectional MVs for the low confidence blocks may also have satisfactory confidence since the bidirectional MVs for the low confidence blocks are obtained based on the bidirectional MVs for the neighboring high confidence blocks after the bidirectional MVs for the high confidence blocks are completely obtained.

Please note that the present invention aims at providing a motion estimation method to find the bidirectional MV for each of the interpolation frame blocks. Those skilled in the art may make modifications and alternations accordingly. For example, in the above embodiments, the SAD is applied as a cost function to perform selection on the candidate MV set; while in another embodiment, another cost function may be applied to select the optimal MV. In the above embodiments, the non-sequential 3DRS method of the present invention calculates the bidirectional MVs in the order from No. 1, No. 2 . . . , to No. 25, and this is one of various possible implementations of the present invention. For example, another calculation order may be from right to left, as long as the bidirectional MVs for the low confidence blocks are calculated after the bidirectional MVs for all of the high confidence blocks are completely obtained.

Figure 10A:
FIG. 10A illustrates an image on an interpolation frame with the motion estimation method according to an embodiment of the present invention.
Figure 10B:
FIG. 10B illustrates an image on an interpolation frame with the conventional motion estimation method.

The motion estimation method of the present invention may realize a preferable interpolation image quality as compared in FIGS. 10A and 10B. FIG. 10A illustrates an image on an interpolation frame with the method of classifying the blocks and determining the reliability and confidence of the unidirectional MVs according to an embodiment of the present invention. FIG. 10B illustrates an image on an interpolation frame with the conventional motion estimation method. The main difference between FIGS. 10A and 10B is in the integrity of the lamppost. In FIG. 10A, the lamppost is complete; while in FIG. 10B, the lamppost is fragmented especially in its lower half part (as in the big-MV-diff blocks marked in the area A). As mentioned above, among the big-MV-diff blocks, an MV directed to/from the lamppost area and an MV directed to/from the grass area may intersect on a block. The conventional method may wrongly select the MV of the grass area such that the lamppost is fragmented. The motion estimation method of the present invention deals with the big-MV-diff blocks according to a statistic result of values of collected MVs to determine the confidence of each MV, so as to find out the most confidential MV as the assigned MV. Therefore, the accurate foreground MV may be selected according to the motion estimation method of the present invention, which achieves the integrity of the foreground object such as the lamppost.

Figure 11A:
FIG. 11A illustrates an image on an interpolation frame with the non-sequential 3DRS method according to an embodiment of the present invention.
Figure 11B:
FIG. 11B illustrates an image on an interpolation frame with the conventional 3DRS method.

FIGS. 11A and 11B illustrate a comparison between the conventional 3DRS method and the non-sequential 3DRS method proposed in the present disclosure. Specifically, FIG. 11A illustrates an image on an interpolation frame with the non-sequential 3DRS method according to an embodiment of the present invention, where the bidirectional MVs for the low confidence blocks are calculated after the bidirectional MVs for the high confidence blocks are completely obtained. FIG. 11B illustrates an image on an interpolation frame with the conventional 3DRS method where the bidirectional MVs for the blocks are calculated in a predetermined order. The main difference between FIGS. 11A and 11B is also in the integrity of the lamppost. In FIG. 11A, the lamppost is complete; while in FIG. 11B, the lamppost loses a piece in its lower half part. Therefore, the non-sequential 3DRS method achieves the integrity of the foreground object such as the lamppost.

As for a video sequence including the interpolation frames, the loss of integrity of the foreground objects may cause the output video to flicker. The motion estimation method of the present invention solves the problem and improves the quality of output video after image interpolation.

To sum up, the present invention provides a motion estimation method applicable to a frame rate converter, for selecting an accurate MV for image interpolation. The unidirectional MVs are applied to determine the image in blocks of an interpolation frame. The interpolation frame blocks are classified into high confidence blocks and low confidence blocks based on whether there is at least one reliable MV mapped onto the interpolation frame blocks. For each high confidence block which is mapped by one or more reliable MVs, one of the reliable MVs mapped onto the high confidence block is selected as the assigned MV, which is further finely tuned to generate the optimal MV. The selection of the assigned MV may be performed according to the confidence of these reliable MVs, where the foreground MVs may have higher confidence and may be selected more probably. The optimal MV is in turn applied to generate the bidirectional MV for the high confidence block. For each of the low confidence block, there is no reliable MV mapped onto the low confidence block, and thus the bidirectional MV for the low confidence block is obtained based on the bidirectional MVs for its neighboring blocks. The present invention further provides a non-sequential 3DRS method where the bidirectional MVs for the low confidence blocks are calculated after the bidirectional MVs for the high confidence blocks are completely obtained. The embodiments of the present invention retain the integrity of the foreground objects, and thereby improve the quality of output video after image interpolation.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A video processor, comprising:
  a frame buffer, for receiving a first original frame and a second original frame; and
  a frame rate converter, coupled to the frame buffer, configured for performing the following steps:
   generating a plurality of unidirectional motion vectors (MVs) based on the first original frame and the second original frame received from the frame buffer;
   classifying each of the plurality of unidirectional MVs as a reliable MV or a mismatch MV;
   mapping the reliable MV onto one of a plurality of blocks of an interpolation frame;
   classifying each of the plurality of blocks as a high confidence block or a low confidence block based on whether there is at least one reliable MV mapped onto the block; and
   determining an assigned MV for each of the high confidence block by selecting one of the at least one reliable MV mapped onto the high confidence block.

2. The video processor of claim 1, wherein the step of classifying each of the plurality of unidirectional MVs as the reliable MV or the mismatch MV comprises:
  calculating a sum of absolute difference (SAD) of a unidirectional MV among the plurality of unidirectional MVs;
  comparing the SAD with a first threshold; and
  classifying the unidirectional MV as the reliable MV when the SAD is smaller than the first threshold, or classifying the unidirectional MV as the mismatch MV when the SAD is greater than the first threshold.

3. The video processor of claim 1, wherein the frame rate converter is further configured for performing the following step:
  determining whether the reliable MV is in a texture area or a flat area.

4. The video processor of claim 3, wherein the step of determining whether the reliable MV is in the texture area or the flat area comprises:
  calculating an SAD and an average of neighboring SAD of a unidirectional MV among the plurality of unidirectional MVs;
  comparing the difference between the SAD and the average of neighboring SAD with a second threshold; and
  determining that the reliable MV is in the texture area when the difference between the SAD and the average of neighboring SAD is greater than the second threshold, or determining that the reliable MV is in the flat area when the difference between the SAD and the average of neighboring SAD is smaller than the second threshold.

5. The video processor of claim 1, wherein the step of classifying each of the plurality of blocks as the high confidence block or the low confidence block based on whether there is at least one reliable MV mapped onto the block comprises:
  classifying a first block among the plurality of blocks as the high confidence block when there is at least one reliable MV mapped onto the first block; and classifying a second block among the plurality of blocks as the low confidence block when there is no reliable MV mapped onto the second block.

6. The video processor of claim 1, wherein the step of determining the assigned MV for each of the high confidence block by selecting one of the at least one reliable MV mapped onto the high confidence block comprises:
when there is only one reliable MV mapped onto the high confidence block, selecting the only one reliable MV as the assigned MV for the high confidence block.

7. The video processor of claim 1, wherein the step of determining the assigned MV for each of the high confidence block by selecting one of the at least one reliable MV mapped onto the high confidence block comprises:
when there are more than two reliable MVs mapped onto the high confidence block and all of the reliable MVs mapped onto the high confidence block are in a flat area, selecting any one of the reliable MVs as the assigned MV for the high confidence block.

8. The video processor of claim 1, wherein the step of determining the assigned MV for each of the high confidence block by selecting one of the at least one reliable MV mapped onto the high confidence block comprises:
when there are more than two reliable MVs mapped onto the high confidence block and the reliable MVs mapped onto the high confidence block comprise at least one first reliable MV in a texture area, selecting one of the first reliable MV in the texture area as the assigned MV for the high confidence block.

9. The video processor of claim 8, wherein when there is only one first reliable MV in the texture area, the step of selecting one of the first reliable MV in the texture area as the assigned MV for the high confidence block comprises:
selecting the only one first reliable MV as the assigned MV for the high confidence block.

10. The video processor of claim 8, wherein when there are more than two first reliable MVs in the texture area, the step of selecting one of the first reliable MVs in the texture area as the assigned MV for the high confidence block comprises:
determining the similarity between the first reliable MVs; and
classifying the high confidence block as a small-MV-diff block when the similarity between the first reliable MVs is higher than a threshold, or classifying the high confidence block as a big-MV-diff block when the similarity between the first reliable MVs is lower than the threshold.

11. The video processor of claim 10, wherein when the high confidence block is classified as the small-MV-diff block, the step of selecting one of the first reliable MVs in the texture area as the assigned MV for the high confidence block further comprises:
selecting any one of the first reliable MVs as the assigned MV for the high confidence block.

12. The video processor of claim 10, wherein when the high confidence block is classified as the big-MV-diff block, the step of selecting one of the first reliable MVs in the texture area as the assigned MV for the high confidence block further comprises:
obtaining the reliable MVs mapped onto other small-MV-diff blocks to generate a statistic result of values of the reliable MVs; and
selecting one of the first reliable MVs as the assigned MV for the high confidence block according to the statistic result.

13. The video processor of claim 12, wherein the step of selecting one of the first reliable MVs as the assigned MV for the high confidence block according to the statistic result comprises:
for each of the first reliable MVs, configuring a range of values based on a value of the first reliable MV;
obtaining a count of MVs having values within the range of values;
obtaining a confidence of each of the first reliable MVs according to the count of MVs, wherein a most confidential MV among the first reliable MVs has a highest confidence when the count of MVs corresponding to the most confidential MV is less than the count of MVs corresponding to any other first reliable MVs; and
selecting the most confidential MV as the assigned MV for the high confidence block.

14. The video processor of claim 1, wherein the frame rate converter is further configured for performing the following steps:
for each of the high confidence block, generating a candidate MV set which comprises the assigned MV and at least one candidate MV each obtained by adding a random value to the assigned MV; and
selecting an optimal MV for the high confidence block from the candidate MV set.

15. The video processor of claim 14, wherein the frame rate converter is further configured for performing the following step:
for each of the high confidence block, obtaining a bidirectional MV according to the optimal MV.

16. The video processor of claim 15, wherein the frame rate converter is further configured for performing the following step:
obtaining a bidirectional MV for the low confidence block after the bidirectional MV for each of the high confidence block is obtained.

* * * * *